United States Patent

Sasse et al.

[11] Patent Number: 6,006,886
[45] Date of Patent: Dec. 28, 1999

[54] HYDRODYNAMIC TORQUE CONVERTER WITH AN AXIAL BEARING ARRANGEMENT PROVIDED WITH SLIDING BEARINGS

[75] Inventors: Christoph Sasse, Schweinfurt; Uwe Dehrmann, Würzburg, both of Germany

[73] Assignee: Mannesmann Sachs AG, Schweinfurt, Germany

[21] Appl. No.: 09/138,296

[22] Filed: Aug. 21, 1998

[30] Foreign Application Priority Data

Aug. 21, 1997 [DE] Germany .................. 197 36 296

[51] Int. Cl.$^6$ .............................. F16D 13/60; F16D 33/00
[52] U.S. Cl. .......................... 192/113.5; 60/345; 60/339; 60/362
[58] Field of Search ................. 192/113.5; 1/45; 60/345, 346, 339, 361, 362; 384/123

[56] References Cited

U.S. PATENT DOCUMENTS

| | | | |
|---|---|---|---|
| 3,027,721 | 4/1962 | Mamo | 60/362 |
| 4,186,557 | 2/1980 | Aria et al. | 60/361 |
| 5,676,230 | 10/1997 | Awaji et al. | 192/113.5 X |
| 5,806,644 | 9/1998 | Hinkel | 192/45.1 |
| 5,881,556 | 3/1999 | Matsuoka | 60/345 X |

*Primary Examiner*—Charles A. Marmor
*Assistant Examiner*—Roger Pang
*Attorney, Agent, or Firm*—Cohen, Pontani, Lieberman & Pavane

[57] ABSTRACT

A hydrodynamic torque converter with a converter circuit comprising an impeller, a turbine and a stator, wherein the stator is held by an axial bearing arrangement in the converter housing at a predetermined relative distance from the impeller and the turbine. The axial bearing arrangement has a grooved sliding bearing at each axial side of the stator. In at least one of the sliding bearings, the grooves are formed through only a part of the entire radial length of the sliding bearing.

4 Claims, 2 Drawing Sheets

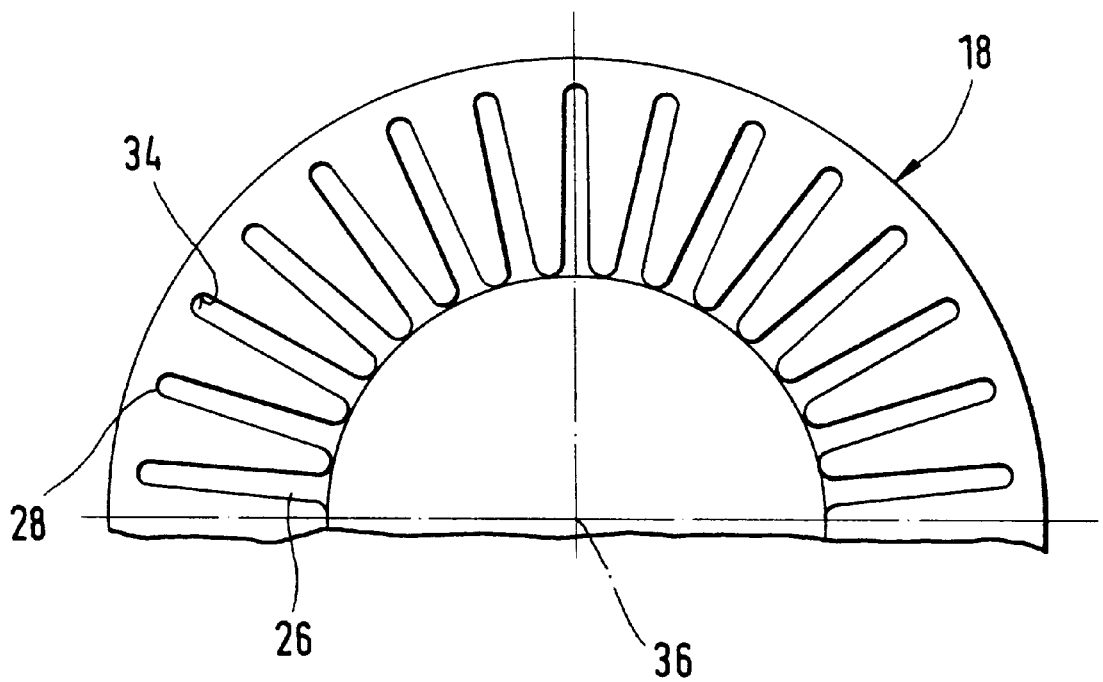

HYDRODYNAMIC TORQUE CONVERTER WITH AN AXIAL BEARING ARRANGEMENT PROVIDED WITH SLIDING BEARINGS

BACKGROUND OF THE INVENTION

1. Field of the Invention

The invention relates to a hydrodynamic torque converter having axial slide bearings.

2. Description of the Related Art

A prior art hydrodynamic torque converter with a converter circuit formed of an impeller, turbine and stator, in which the stator is held by an axial bearing arrangement in the converter housing at a predetermined relative distance from the impeller and turbine is disclosed in German reference DE 195 33 151 A1. In the prior art device, a grooved sliding bearing which can be made of plastic is provided at each axial side of the stator to form the axial bearing. The grooves are constructed such that the individual grooves extend along an entire radial extension of the slide bearing.

A supplied hydraulic fluid flows through the grooves with very low resistance because the grooves extend radially from the inner radial end to the outer radial end of the sliding bearings. Because of the low resistance, the pressure existing in these through-grooves is not always sufficient to ensure hydrodynamic support between the slide bearing and an axially adjacent support structure, such as an impeller hub. This results in a frictional influence. For this reason, these sliding bearings are required to be constructed with high resistance to wear. Further, this prior art construction makes it is possible for hydraulic fluid to flow back into the converter circuit at the sliding bearing between the freewheel and the impeller, which can result in overheating of the torque converter.

The sliding bearings are usually secured to the stator in a positive engagement, such as with a tongue-and-groove connection. Due to the fact, mentioned above, that the hydrodynamic support in these grooves is not always sufficient, axial play may result enabling relative movement in the positive engagement which is perceivable as rattling and can ultimately lead to vibration fracture.

SUMMARY OF THE INVENTION

It is the object of the invention to develop sliding bearings in an axial bearing arrangement for the stator in such a way that wear caused by friction and vibration fracture are prevented.

This object is met according to the present invention in that the grooves of at least one of the sliding bearings are formed in a part of the radial length of the of the sliding bearing, thereby preventing a low resistance flow of hydraulic fluid through the groove.

When the sliding bearing has grooves open on its side facing a hydraulic circuit of the converter, but has no grooves and is closed on the opposite side, hydraulic fluid penetrates into and flows through grooves. However, because the grooves are only formed along part of the radial length of this sliding bearing and do not form through-passages at their closed end, there results a backup pressure which ensures that the bearing is always hydrodynamically supporting, and friction and accordingly wear caused by friction are excluded. The hydrostatic pressure in the grooves also exerts pressure acting in the axial direction so that a rear side of the sliding bearings, remote from the grooves, is always pressed against an adjacent structural component part, for example, the freewheel. Assuming that there is a positive engagement, for example, in the form of a tongue-and-groove connection, between the sliding bearing and the structural component part located adjacent thereto, any relative movement between these structural component parts is suppressed the axially directed hydrostatic pressure. The advantages brought about by this backup effect at the closed end of the grooves are clearly realized especially when the blind end of the grooves is provided on the radial outside of the groove. In this case, the hydraulic fluid is forced radially outward accompanied by suppression of the centrifugal force during rotation of the sliding bearing arrangement or of the associated friction partner such as the converter housing or a turbine hub.

Such a construction of a sliding bearing at the stator is possible on the pump side as well as on the turbine side. However, arrangement on the pump side is particularly advantageous because hydraulic fluid that is already heated is prevented from flowing back into the converter at this location by the groove limiter, i.e., the blind end of the groove, which enables improved cooling of the converter circuit.

At least one of the sliding bearings can be fitted in a frictional engagement, e.g., by pressing into the stator, when suitable thermoplastics are used.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views:

FIG. 2 shows the top half of the sliding bearing of FIG. 1.

DETAILED DESCRIPTION OF THE PRESENTLY PREFERRED EMBODIMENTS

Figure 1:
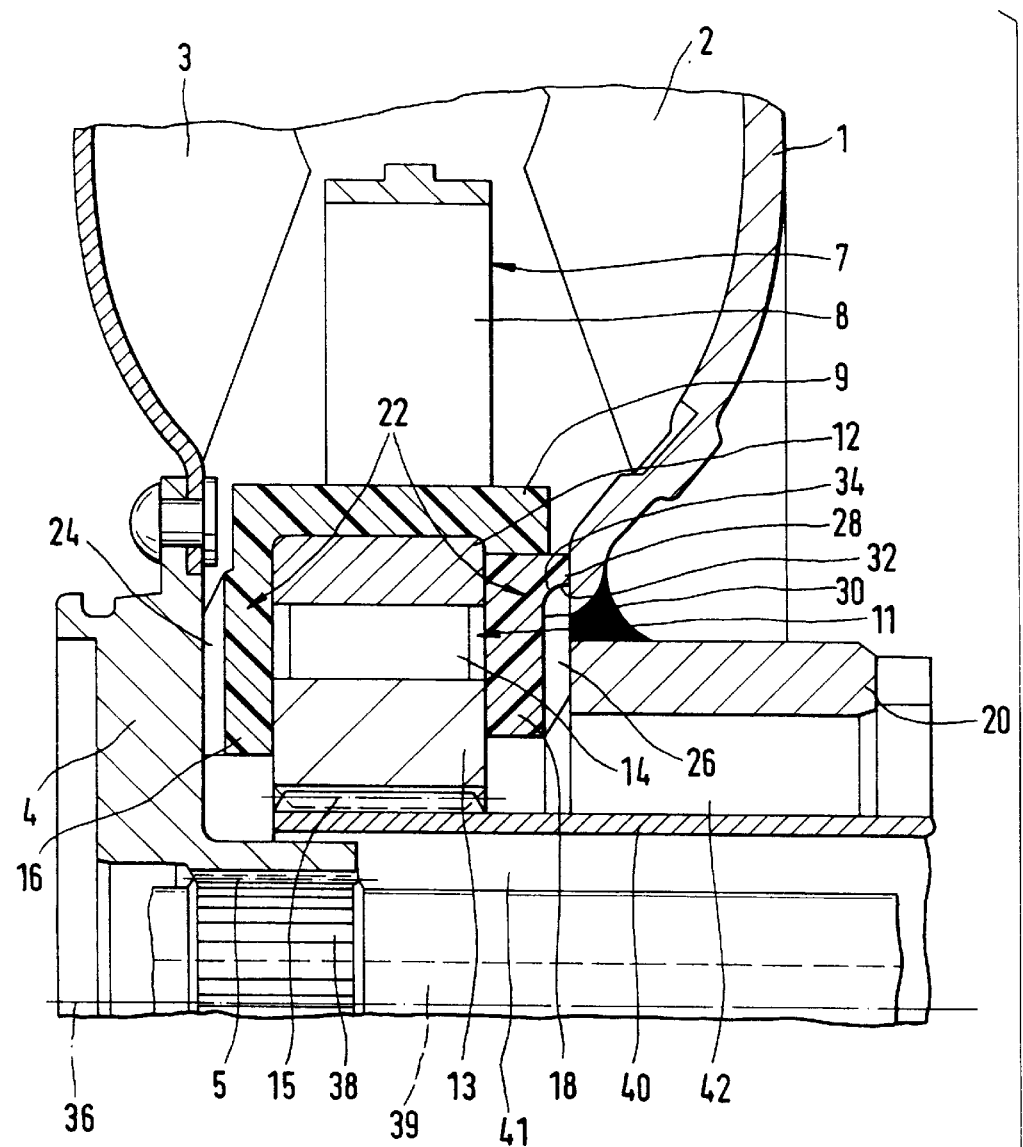
FIG. 1 shows a partial sectional view of a hydrodynamic torque converter according to an embodiment of the present invention with grooved sliding bearings for the stator.
Figure 1:
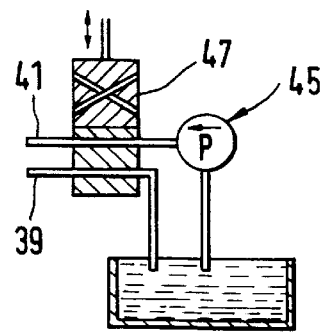

Hydrodynamic torque converters with an axial bearing arrangement provided with sliding bearings for a stator are known, e.g., from the above-cited DE 195 33 151 A1. The area around the stator essential to the invention is shown in FIG. 1. A converter housing 1 is rotatable about an axis of rotation 36 and is fixedly connected with an impeller 2. A radially inner region of the converter housing 1 is welded with a sleeve 20 facing a driven side of the hydrodynamic torque converter. The impeller 2 cooperates with a turbine 3 which is fastened by its radial inner region to a turbine hub 4. A toothing 5 connects the turbine hub 4 with a driven shaft 38 such that the turbine hub 4 and driven shaft 38 are fixed with respect to rotation relative to each other. A stator 7 having a blade arrangement 8 is arranged axially between the impeller 2 and the turbine 3. The blade arrangement 8 is fastened to a stator hub 9. The stator hub 9 is part of an axial sliding bearing 16 and is pressed, or injection-molded, onto a radial outer freewheel ring 12 portion of a freewheel 11. Both the axial sliding bearing 16 and the stator hub 9 are preferably made of plastic which is capable of injection molding.

The radial outer freewheel ring 12 is connected via clamping bodies 14 with a radial inner freewheel ring 13 of the freewheel 11. The inner freewheel ring 13 is supported via a toothing 15 at a bush 40 on the driven side.

The sliding bearing 16 mentioned above is arranged axially between the freewheel 11 and the turbine hub 4 and is formed with a through-groove 24 at the side on which the frictional movement occurs, that is, at the side facing the turbine hub 4. The through-groove 24 receives fresh hydraulic fluid for supplying the converter circuit via a hydraulic circuit supply 45. This is carried out, as can be seen, for example, from DE 44 23 640 A1, via a duct 41 which extends radially between the bush 40 and the driven shaft 38. The duct 41 is connected to the hydraulic circuit supply 45 by way of a pump P and an on-off valve or switching valve 47. An axial bore 39 in the power take-off or driven shaft 38 is likewise connected to the hydraulic circuit supply 45. By means of the switching valve 47, it can be predetermined whether the axial bore 39 will serve as inlet for fresh hydraulic fluid and the duct 41 will serve as outlet, or vice versa.

A duct 42 between the bush 40 and the sleeve 20 is supplied along with duct 41 in the same flow direction, wherein, by way of the teeth 15 between the inner freewheel ring 13 and the bushing 40, the hydraulic fluid conducted via duct 42 can reach a sliding bearing 18 located between the freewheel 11 and the sleeve 20 as well as the sliding bearing 16 via teeth 15. While the hydraulic fluid is supplied to the converter circuit at the sliding bearing 16 via the through-groove 24, the sliding bearing 18 has a groove 26 having radial outer end 34 and a radial inner end. The radial outer end 34 of this groove 26 passes via a curved reduced portion 32 into a groove limiter 28 which contacts the converter housing 1 axially. A base 30 of the sliding bearing is determined by the depth of the grooves 26. Hydraulic fluid flowing in along the duct 42 flows into the groove 26 and backs up at its radial outer end 34 while building up a hydrostatic pressure which acts axially between the converter housing 1 and the sliding bearing 18, on the one hand, and between the sliding bearing 18 and the sleeve 20, on the other hand. Because of this hydrostatic pressure, relative rotational movements of the sliding bearing 18 relative to the converter housing 1 and sleeve 20 only result in fluid friction, so that there is little wear on these components. Further, the sliding bearing 18 is pressed axially against the freewheel rings 12, 13, so that axial movement in the toothed engagement of the freewheel ring 11 is substantially eliminated. The invention is not limited by the embodiments described above which are presented as examples only but can be modified in various ways within the scope of protection defined by the appended patent claims.

We claim:

1. A hydrodynamic torque converter with a converter circuit, comprising:

a converter housing having an impeller and rotatably mounted for rotation about an axis of rotation;

a turbine rotatably mounted relative to said impeller for rotation about said axis of rotation;

a stator mounted between said impeller and said turbine;

a bearing arrangement for holding said stator in said converter housing at a predetermined distance relative to said impeller and said turbine, said bearing arrangement having a first axial side and a second axial side relative to said axis of rotation;

a first sliding bearing at said first axial side of said bearing arrangement; and a second sliding bearing at said second axial side of said bearing arrangement, wherein one of said first and second sliding bearings is comprised of grooves formed along less than a full radial length of said one of said first and second sliding bearings, so that a low resistance flow of hydraulic fluid from an inner radial end to an outer radial end of said at least one of said first and second slide bearings through said grooves is prevented.

2. The hydrodynamic torque converter of claim 1, further comprising:

a hydraulic supply for said hydraulic converter circuit; and a groove limiter mounted on said one of said first and second sliding bearings for limiting a radial length of said grooves at a radial side of said grooves remote from said hydraulic circuit supply.

3. The hydrodynamic torque converter of claim 2, wherein said grooves comprise an axial depth and said groove limiter comprises an annular shape and axially projects over a base of said one of said first and second sliding bearings by at least at a height equal to said axial depth of said grooves.

4. The hydrodynamic torque converter of claim 3, wherein said grooves comprise a portion adjacent said base comprising a decreasing axial depth toward said groove limiter.

* * * * *